Oct. 7, 1958    F. E. PAYNE    2,855,226
ROTARY MECHANICAL SEAL
Original Filed Sept. 2, 1952
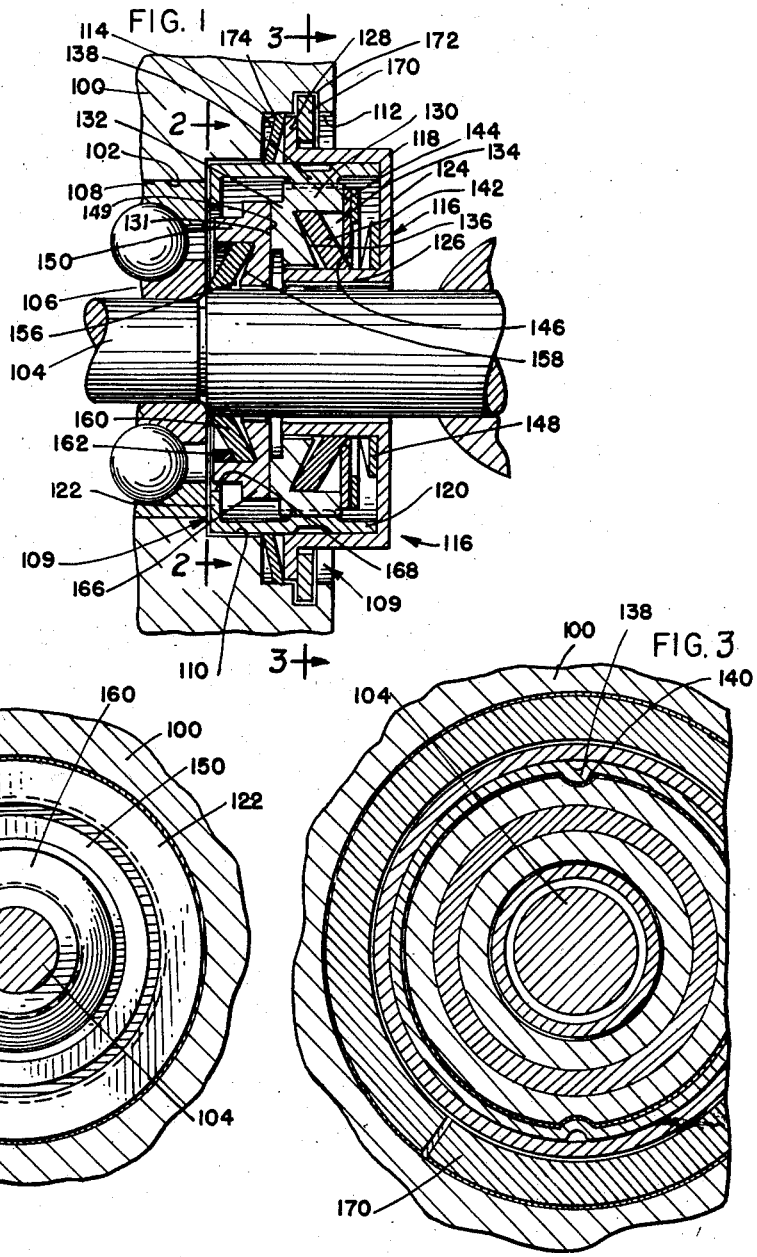
INVENTOR:
FRANK E. PAYNE
BY
Edward R. Lowndes

United States Patent Office 2,855,226
Patented Oct. 7, 1958

2,855,226
ROTARY MECHANICAL SEAL

Frank E. Payne, Glencoe, Ill., assignor to Crane Packing Company, Chicago, Ill., a corporation of Illinois Original application September 2, 1952, Serial No. 307,455. Divided and this application August 30, 1955, Serial No. 534,959

2 Claims. (Cl. 286—11.14)

This application is a division of application Serial No. 307,455, filed September 2, 1952.

The improved fluid seal comprising the present invention has been designed primarily for use in connection with end face seals. The invention, however, is susceptible to other uses and the same may, if desired, with suitable modification, be adapted for use with lip type seals. The invention may also be found useful in connection with packing glands for stationary parts, as for example as a packing assembly for such glands, or as a gasket for sealing relatively stationary parts. Irrespective however of the particular use to which the present invention may be put, the essential features thereof are at all times preserved.

Bearing seals constructed in accordance with the principles of the present invention will be found useful for ordinary applications, as for example in automotive fluid circulating pumps, refrigerator drive units and other mechanisms wherein ordinary temperatures, pressures and chemically inert liquids prevail and where other types of seals have served their purposes with a reasonable degree of success. The invention will find further usefulness in connection with special applications involving high temperatures, pressures, active chemicals or any combination of these phenomena where other seals have proven unreliable. Examples of such special applications are hot water heaters, where temperatures in the neighborhood of 275° F. are encountered, in steam installations where higher temperatures and pressures as high as 400 p. s. i. are not uncommon, or in chemical manufacturing or treating establishments where corrosive liquids are pumped under pressure and at high temperatures and/or pressures. One specific example of this latter use for the seal is in glass etching plants where hydrofluoric acid is recirculated.

The efficiency of the present bearing seal for such uses is predicated upon a different operating principle, a new design and the use of modern materials developed for seal purposes but employed in a new manner so as to produce a highly efficient seal capable of the many and varied uses outlined above.

The provision of a seal of the character briefly outlined above being among the principal objects of the invention, a further object thereof, in an end face seal having running sealing surfaces, is to provide an effective seal between one of the sealing elements per se and the element on which it is mounted, whether the latter be the stationary part or whether it be the rotating or otherwise relatively movable part.

In carrying out the above mentioned objects, briefly, the invention contemplates the provision of a novel form of sealing ring designed for interpositioning between two parts which are to be sealed relative to each other, together with yieldable pressure applying means for causing the sealing ring to bear against each of the two parts by a wedging action wherein the sealing ring or member is firmly pressed into engagement with each of the two parts.

A still further object of the invention, in a seal of this character, is to provide such a sealing ring together with means for applying pressure thereto which is so disposed relative to the two parts that extremely small pressures need be applied to the member to effect sealing engagement with the two parts between which it is interpositioned. In this manner the rate of the spring employed may be extremeley low while at the same time it will effect relatively high pressures at the sealing surfaces. The provision of a seal of this character thus permits the use of a spring having relatively small dimensions so as to enable the overall size of the seal to be materially reduced.

Yet another object of the invention is to provide a novel form of bearing seal unit in which one of the sealing elements thereof is comprised of a material such as "Teflon" which is not readily deformable under compressional forces and which, therefore, when used as the wedging member previously referred to, is extremely effective in its wedging action and creates a relatively high degree of pressure at its contact surfaces for sealing purposes, such pressure being considerably greater than the applied pressure.

Still another object of the invention in a bearing seal of this character is to provide a novel package-type seal which is substantially self-contained, i. e. in which all the parts thereof may be assembled by the seal manufacturer so that the entire seal may be handled as a unit.

A further object of the invention is to provide such a seal in which the various parts that make up the same may be assembled and permanently secured in position without necessitating the use of fastening devices such as set screws and the like and which, when thus assembled, may be applied as a unit to the relative rotatable parts for sealing purposes.

A further object of the invention, a modified form thereof, is to provide a sealing unit in the form of a gasket which operates in a recess provided for it between two parts to be sealed by effecting a strong wedging action against the walls of both parts to seal them with respect to each other while at the same time only a relatively small degree of force is required to compress the gasket sufficiently to cause the same to effectively perform the sealing services required of it.

The provision of a seal of the character set forth above which is relatively simple in its construction and which therefore may be manufactured at a low cost; one which is rugged and durable in use and which therefore is capable of long and efficient use; one which is possessed of a minimum number of relatively moving parts and which therefore is unlikely to get out of order; one which is silent in its operation; and one which otherwise is well adapted to perform the services required of it are further desirable features that have been borne in mind in the production and development of the invention.

Other objects and advantages of the invention, not at this time enumerated will become more readily apparent as the nature of the invention is better understood.

In the accompanying two sheets of drawings forming a part of this specification, several embodiments of the invention have been shown. In these drawings:

Fig. 1 is a longitudinal sectional view showing a compound package-type sealing unit embodying several applications of the present invention in sealing the counterpart elements thereof, the seal as a whole being employed for the purpose of sealing a rotatable shaft relative to the housing in which it is rotatably mounted.

Fig. 2 is a sectional view taken substantially along the line 2—2 of Fig. 1, and Fig. 3 is a sectional view taken substantially along the line 3—3 of Fig. 2.

In all of the above described views, similar characters of reference are employed to designate similar parts throughout.

Referring now to the drawings in detail, wherein a composite package-type seal utilizing the principles of the present invention has been illustrated, the sealing assembly has been shown operatively disposed in a pump installation including a casing 100 having an opening 102 therein through which an impeller shaft 104 extends and in which it is rotatably journalled by means of a ball bearing assembly including inner and outer races 106 and 108 respectively. The inner race 106 may turn with the shaft 104 while the outer race 108 is pressed into the casing 100. The forward face of the casing is provided with a stepped recess 109 having an inner cylindrical wall 110 and an outer cylindrical wall 112 between which there extends a radially disposed wall 114. The recess 109 is adapted to receive therein the package-type sealing assembly of the present invention which has been designated in its entirety at 116.

The seal assembly 116 involves in its general organization a two-part retainer or shell including an outer shell member 118 and an inner nested shell member 120. The inner and outer shell members 120 and 118 together provide a composite container casing including a radially inwardly disposed front wall 122 on the inner shell and a rear wall 124 on the outer shell. The inner edge of the rear wall 124 is provided with an inturned cylindrical flange 126 which surrounds the shaft 104 and which is spaced therefrom a slight distance. The seal assembly 116 includes a sealing washer 130 having a forwardly extending nose piece 132 and a rearwardly facing circular recess 134 provided with a generally conical bottom face 136. The inner shell 120 is provided with a pair of inwardly offset ribs 138 which extend into a pair of diametrically opposed grooves 140 provided in the periphery of the washer 130 for locking the washer to the retainer or shell and preventing rotation of the washer while permitting axial movement thereof relative to the shaft 104.

The washer 130 is adapted to be sealed to the cylindrical portion 126 of the composite retainer casing by means of one or more sealing rings such as the single sealing ring shown at 142. The sealing ring 142 is of frusto-conical design and is formed of a material which is relatively incompressible. The term "incompressible" as employed herein refers to the inability of the material to decrease in overall volume when subjected to a compressional force. In other words, the material lacks compressibility in the sense that a sponge possesses it. One material which fulfills the requirements of the present seal is a polytetrafluoroethylene polymer which is manufactured and sold by E. I. du Pont de Nemours & Co., under the trade-name "Teflon." This material is characterized by its chemical inertness ranging from extremely low temperatures up to 572° F. In this range the material resists the attack of corrosive reagents and solvents. Physically, molded "Teflon" is a tough white-to-gray solid. The material is practically incompressible but it is subject to deformation or cold flow with such deformation taking place in direct proportion to some power of the applied deforming force. Upon release of the compressive force the material tends to resume its original dimensions.

The inner conical face of the member 142 has a slant angle which is slightly less than the slant angle of the bottom face 136 of the recess 134.

A thrust washer 144 has its outer periphery bearing against the rear face of the washer 130 and its inner periphery is formed with a rounded edge 146 which bears against the rear face of the sealing ring 142 at a region adjacent its inner peripheral edge. A circular leaf spring 148 is disposed between the rear wall 124 and washer 144 and normally urges the same forwardly against the sealing ring 142.

The end face 131 of the nose piece 132 is adapted to sealingly bear against a radial face 149 provided on a rotating ring member or seat 150. The seat member 150 is provided with an annular recess 156 providing a conical surface 158. A frusto-conical sealing ring 160, similar to the sealing ring 142, has one end thereof disposed in the recess 136 and the other end thereof bears against the shaft 104 and against the inner race 106 of the ball bearing assembly 106, 108. A spacer ring 162 is disposed within the annular confines of the seat member 150 and may be pressed fitted therein. One end face 164 of the spacer ring 162 is bevelled and bears against an inclined surface on the sealing member 160.

The seat member 150 is formed with a radial shoulder 166 which extends radially beyond the opening 168 provided in the front wall 122 so as to retain the seat member within the shell-like casing when the sealing assembly 116 is removed from the shaft 104. With the assembly thus isolated, the leaf spring 148 normally urges the washer 130 forwardly in the retainer and the washer in turn urges the seat member 150 forwardly so that the shoulder 166 thereof normally bears against the inner face of the front wall 122 with a portion of said member projecting outwardly through the opening 168 when the seal assembly is not installed. The spacer ring 162 bears firmly against the inner periphery of the cone-shaped member and retains this member in position against dislodgement.

From the above description it will be seen that all of the sealing elements thus far described which are contained within the shell-like container are permanently housed within this container against dislodgement, thus resulting in a package-type seal capable of installation in a recess such as the stepped recess 109 provided in the pump casing 110. In order to secure the assembly within the recess, the radially extending flange 128 may be positioned behind a split snap ring 170 (see also Fig. 3) which is disposed within a groove 172 formed in the outer cylindrical wall 112 of the recess 109. A frusto-conical sealing gasket 174 is disposed within the space existing between the flange 128 and the radial wall 114 and this member has a slant height or radial length slightly greater than the radial distance between the outer surface of the inner shell 120 and the inner surface of the outer cylindrical wall 112 so that when the flange 128 is positioned behind the snap ring 170 a wedging action of the gasket 174 between these two surfaces will result, thus effecting a fluid-tight gasket seal.

In the installation of the package seal 116, the entire unit is telescopically received over the shaft 104 and is inserted in the stepped recess 109 with the parts positioned as shown in Fig. 1. When the radially extending flange 128 clears the annular groove 172 the split snap ring 170 is inserted in position within the groove. The non-compressible frusto-conical gasket 174 will thus be firmly wedged in place between the outer face of the inner shell member 120 and the cylindrical wall of the recess 109. The inner rim of the frusto-conical sealing member 160 will bear against the shaft 104 as well as against the inner race 106 of the ball bearing assembly and thus the rotary seat member 150 will be moved away from the front wall 122 thus shifting the sealing washer 130 to the right as viewed in Fig. 1 against the action of the leaf spring 148. This leaf spring will exert its thrust against the thrust washer 144 which in turn will bear at its inner peripheral rounded edge 146 against the inner circumferential regions of the sealing member 142. The tendency for the sealing member 142 will be to normally urge the washer 130 forwardly against the rotating seat member 150 to form a fluid-tight seal between the opposed sealing surfaces 152, and 154 thereof. A balanced condition will obtain wherein the pressure applied to the sealing ring 142 equals the pressure applied to the sealing ring 160 and these two members will tend to become wedged within the spaces provided for them so that their peripheral edges will effect sealing engagement with the cylindrical surfaces with which they are in contact.

In the form of the invention just described, single frusto-conical sealing members 142, 160 and 174 have been illustrated as effectively performing their sealing function within the spaces provided for them. It will be understood however that if desired plural sealing members may be utilized in these spaces. Inasmuch as there is less likelihood of a carbonaceous deposit of scale on the shaft 104 in the vicinity of the sealing member 160 one of these members is deemed to be sufficient.

From the above description it will be seen that the present bearing seal will be effective in maintaining a seal against both internal and external pressures relative to a housing through which a shaft may extend. Furthermore the pressure differential is maintained across sealing surfaces which do not rub against one another and the only parts which are subject to wear are the opposed running seal surface 131, 152 of the seal assembly.

The invention is not to be limited to the exact arrangement of parts shown in the accompanying drawing and described in this specification as various changes in the details of construction may be resorted to without departing from the spirit of the invention. For example, while the annular recess provided in each of the various sealing washers or seat elements has been shown and described as having a cylindrical wall designed for cooperation with the circular periphery of a frusto-conical sealing member, the recess may, if desired, be other than cylindrical, as for example polyhedral, and designed for cooperation with a commensurately shaped sealing member, such as a frusto-pyramidal member whose polygonal periphery will effect sealing engagement with the walls of the recess when a wedging of the seating member is effected. The term "annular" as employed in the appended claims in relation to the wall of such a recess does not necessarily imply that the wall is truly cylindrical. Only insofar as the invention has particularly been pointed out in the accompanying claims is the same to be limited.

What I claim and desire to secure by Letters Patent is:

1. A self-contained sealing unit for effecting a fluid tight seal between a shaft and a recessed casing comprising a cylindrical housing including a generally cylindrical outer wall and spaced front and rear end walls each having a central opening therein through which the shaft is adapted to extend, said housing being receivable in the casing recess, an axially extending forwardly directed flange surrounding the opening in the rear wall and adapted to surround the shaft in close proximity thereto, a circular sealing washer surrounding said flange and disposed between the latter and said cylindrical wall, there being an axial recess formed in the rear side of the washer and presenting a cylindrical wall and a frusto-conical bottom wall, a deformable but incompressible sealing ring in the form of a frusto-conical web of greater depth than the axial extent of the recess bottom and disposed within the recess, said web having a slant height greater than the radial distance between the flange and cylindrical recess wall, spring means disposed between said sealing ring and said rear wall for urging the sealing ring forwardly within the housing and serving to wedge the sealing ring between the flange and cylindrical housing wall, a rotatable seat member disposed within said housing and capable of projection through the opening in said front wall, said seat member being formed with an annular shoulder extending radially beyond the rim of said latter opening to retain the seat member within the housing, there being an axial recess formed in said seat member in the forward side thereof and having a frusto-conical bottom, a deformable but incompressible sealing ring disposed within said recess, said latter sealing ring being in the form of a frusto-conical web, a ring fitting within said recess and bearing against said sealing member and serving to retain the same within the recess provided in said seat member, said latter sealing ring being adapted to surround the shaft with its inner periphery bearing against a surface normal to the shaft and with its outer periphery bearing outwardly against the wall of the recess and against the bottom thereof, said washer and seat member having opposed mating running sealing surfaces, and interlocking elements on said washer and cylindrical wall of the housing.

2. A self-contained sealing unit for effecting a fluid tight seal between a shaft and a recessed casing comprising a cylindrical housing including a generally cylindrical outer wall and spaced front and rear walls each having a central opening therein through which the shaft is adapted to extend, said housing being receivable in the casing recess, an axially extending forwardly directed flange surrounding the opening in the rear wall and adapted to surround the shaft in close proximity thereto, a circular sealing washer surrounding said flange and disposed between the latter and said cylindrical wall, there being an axial recess formed in the rear side of the washer and presenting a frusto-conical bottom and a substantially cylindrical side wall, a deformable but incompressible sealing ring in the form of a frusto-conical web of greater depth than the axial extent of the recess bottom disposed within the recess, said web having a slant height greater than the radial distance between the flange and cylindrical side wall, spring means disposed between said sealing ring and said rear wall for urging the sealing ring forwardly within the housing and serving to wedge the sealing ring between the flange and side wall, a rotatable seat member disposed within said housing and capable of projection through the opening in said front wall, said seat member being formed with an annular shoulder extending radially beyond the rim of said latter opening to retain the seat member within the housing, said seat member being of annular configuration and adapted to surround said shaft, and means carried by said seat member for sealingly securing the same to said shaft for rotation in unison therewith, said washer and seat member having opposed mating running sealing surfaces.

References Cited in the file of this patent

UNITED STATES PATENTS

| | | |
|---|---|---|
| 1,995,109 | Smittle | Mar. 19, 1935 |
| 2,148,093 | Wheeler | Feb. 21, 1939 |
| 2,352,636 | Jackman | July 4, 1944 |
| 2,467,312 | Jack | Apr. 12, 1949 |